(12) United States Patent
Katz et al.

(10) Patent No.: US 9,904,959 B2
(45) Date of Patent: Feb. 27, 2018

(54) DESCRIPTOR EXCHANGE

(71) Applicant: VERIFI, INC., Los Angeles, CA (US)

(72) Inventors: Matthew G. Katz, Los Angeles, CA (US); Jeremy J. Waxman, King of Prussia, PA (US); Jeffrey Sawitke, Mentor, OH (US)

(73) Assignee: Verifi, Inc., Los Angeles, CA (US)

( * ) Notice: Subject to any disclaimer, the term of this patent is extended or adjusted under 35 U.S.C. 154(b) by 168 days.

(21) Appl. No.: 14/300,057

(22) Filed: Jun. 9, 2014

(65) Prior Publication Data
US 2015/0356688 A1 Dec. 10, 2015

(51) Int. Cl.
*G06F 17/30* (2006.01)
*G06Q 40/00* (2012.01)

(52) U.S. Cl.
CPC ....... *G06Q 40/12* (2013.12); *G06F 17/30303* (2013.01)

(58) Field of Classification Search
USPC ................................. 707/706, 722
See application file for complete search history.

(56) References Cited

U.S. PATENT DOCUMENTS

| | | | |
|---|---|---|---|
| 7,660,768 B2 * | 2/2010 | Beck ............ | G06Q 10/02 235/380 |
| 8,930,295 B2 * | 1/2015 | Campbell ........ | G06Q 40/00 706/46 |
| 9,058,380 B2 * | 6/2015 | Lesiecki ......... | G06F 17/30542 |
| 2002/0004772 A1 * | 1/2002 | Templeton ....... | G06Q 10/0635 705/35 |
| 2006/0173985 A1 | 8/2006 | Moore | |
| 2010/0138324 A1 * | 6/2010 | Allen ........... | G06Q 20/0425 705/30 |
| 2010/0274653 A1 | 10/2010 | Hammad | |
| 2011/0022628 A1 * | 1/2011 | Kramer ......... | G06Q 20/10 707/769 |
| 2013/0290244 A1 | 10/2013 | Nucci et al. | |
| 2014/0279299 A1 * | 9/2014 | Erenrich ........ | G06F 17/30312 705/30 |
| 2015/0213431 A1 * | 7/2015 | Goldstein ....... | G06Q 20/12 705/39 |

OTHER PUBLICATIONS

International Search Report for International App. No. PCT/US2015/034937 dated Nov. 9, 2015.
Written Opinion for International App. No. PCT/US2015/034937 dated Nov. 9, 2015.

* cited by examiner

*Primary Examiner* — Kim Nguyen
(74) *Attorney, Agent, or Firm* — Knobbe, Martens, Olson & Bear, LLP (57) ABSTRACT

The subject disclosure relates to systems and methods for creating and managing a descriptor repository. In certain aspects, a method of the subject technology includes steps for receiving a descriptor label for a merchant, receiving a plurality of descriptor definitions for the descriptor label, and storing the plurality of descriptor definitions in a database. In certain aspects, a method of the subject technology can further include steps for receiving relevance indications for one or more of the descriptor definitions, and associating one or more of the descriptor definitions with the descriptor label based on the one or more relevance indications.

20 Claims, 5 Drawing Sheets

DESCRIPTOR EXCHANGE

BACKGROUND

1. Technical Field

The disclosed subject matter provides solutions for building and maintaining a descriptor repository used to describe financial transactions. In particular, aspects of the technology provide systems and methods for crowdsourcing details of descriptor labels (i.e., descriptor definitions) associated with merchant transactions, for use in contextualizing financial transactions.

2. Introduction

Many merchants provide basic financial transaction information for purchases processed using a payment service, such as a credit or debit card, bank account, PayPal, or an alternative payment method. As used herein, financial transaction information that is initially provided by merchants is referred to as a merchant descriptor label or "descriptor label." Descriptor labels are generally included on payment authorizations and/or settlement transactions and posted to the cardholder's statement. Descriptor labels provide the consumer with information about the purchase, including for example, a name of the associated merchant. The intent is to remind the consumer what goods and/or services were purchased on the specified date and for the specified amount.

However, most descriptor labels are not standardized or easily understood, making it difficult for the consumer to recognize the transaction and recall the purpose of the purchase. As a result, the task of trying to understand an itemized bill, such as a credit statement, or bank statement, is often difficult for the consumer, leaving him/her to guess the reason for a particular transaction, or what goods/services were purchased. This confusion results in consumers contacting their financial institution to dispute the transaction. Often the consumer will claim that he/she does not recognize the transaction. This is not only frustrating for the consumer, but also, when aggregated across many such cases, a cause of considerable expense for the financial institution handling the consumer calls.

SUMMARY

In certain aspects, the disclosed subject matter relates to a computer-implemented method including steps for receiving a descriptor label for a merchant, wherein the descriptor label provides contextual information for financial transactions associated with the merchant, receiving a plurality of descriptor definitions for the descriptor label, wherein each of the descriptor definitions provides contextual information for the financial transactions associated with the merchant, and storing the plurality of descriptor definitions in a database. In certain aspects, methods of the subject technology can further include steps for receiving one or more relevance indications for one or more of the descriptor definitions, wherein each of the relevance indications is based on a relative usefulness of a respective descriptor definition for providing contextual information for the financial transactions associated with the merchant, and associating one or more of the descriptor definitions with the descriptor label based on the one or more relevance indications.

In another aspect, the disclosed subject matter relates to a system for managing a descriptor repository or database. The system can include one or more processors that are configured to perform operations for receiving a descriptor label for a merchant, wherein the descriptor label provides contextual information for financial transactions associated with the merchant, receiving a plurality of descriptor definitions for the descriptor label, wherein each of the descriptor definitions provides contextual information for the financial transactions associated with the merchant, and storing the plurality of descriptor definitions in a database. In some implementations, the processors can be further configured to perform operations including: receiving one or more relevance indications for one or more of the descriptor definitions, wherein each of the relevance indications is based on a relative usefulness of a respective descriptor definition for providing contextual information for the financial transactions associated with the merchant, and associating one or more of the descriptor definitions with the descriptor label based on the one or more relevance indications.

In yet another aspect, the disclosed subject matter relates to a computer-readable medium including instructions stored therein, which when executed by one or more processor/s, cause the processor/s to perform operations that include receiving a descriptor label for a merchant, wherein the descriptor label provides contextual information for financial transactions associated with the merchant, receiving a plurality of descriptor definitions for the descriptor label, wherein each of the descriptor definitions provides contextual information for the financial transactions associated with the merchant, and storing the plurality of descriptor definitions in a database. In some aspects, the instructions can further include receiving one or more relevance indications for one or more of the descriptor definitions, wherein each of the relevance indications is based on a relative usefulness of a respective descriptor definition for providing contextual information for the financial transactions associated with the merchant, and associating one or more of the descriptor definitions with the descriptor label based on the one or more relevance indications.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The subject technology addresses the foregoing need by providing means for accumulating and organizing a repository of descriptor labels. The descriptor labels are then associated with definitions ("descriptor definitions"), for providing contextual information for an associated merchant transaction. By providing supplemental information for the descriptor labels, consumers, card issuers, financial institutions and/or payment methods/processors are provided with accurate and relevant information with which to identify merchants and the reasons for the associated transactions.

In some implementations, descriptor definitions are crowdsourced (e.g., from card issuers, financial institutions and/or consumers, etc.), or provided as a direct feed from the descriptor label origination (i.e., the merchants). Subsequently, when merchant transactions are reviewed (e.g., on a credit card or a bank account statement), the information provided by the description definitions, which is gathered on the descriptor label, provides additional contextual information for the descriptor label to help in identifying a corresponding purchase.

Multiple descriptor definitions can be provided for a particular descriptor label. In such instances, a relevance or quality ranking can be used to organize the descriptor definitions for a given descriptor label (i.e., to manage associations between descriptor definitions. Although ranking can be performed using various methods, including but not limited to, automated computer ranking, in certain aspects, manual ranking is performed, for example, by human operators, such as a card issuer account manager or customer service employee. By continuously receiving new descriptor definitions, and updating quality rankings for associations with their respective descriptor labels, the descriptor repository improves over time, increasing in accuracy and relevance.

Descriptor definition quality can be determined using a computer-implemented and/or human assisted method. In certain aspects, descriptor definition quality determinations can be based on an operator provided "up-vote" indication, for example, indicating that a particular definition/detail successfully helped a customer identify an associated merchant transaction. Additionally, in some implementations, descriptor definition/detail quality can be based on an automatically updating, or adaptive, machine learning model.

As discussed in further detail below, the ability to crowd source descriptor definitions for a particular descriptor label provides significant advantages over conventional implementations, which merely rely on merchant provided descriptor labels to provide transaction context.

Figure 1:
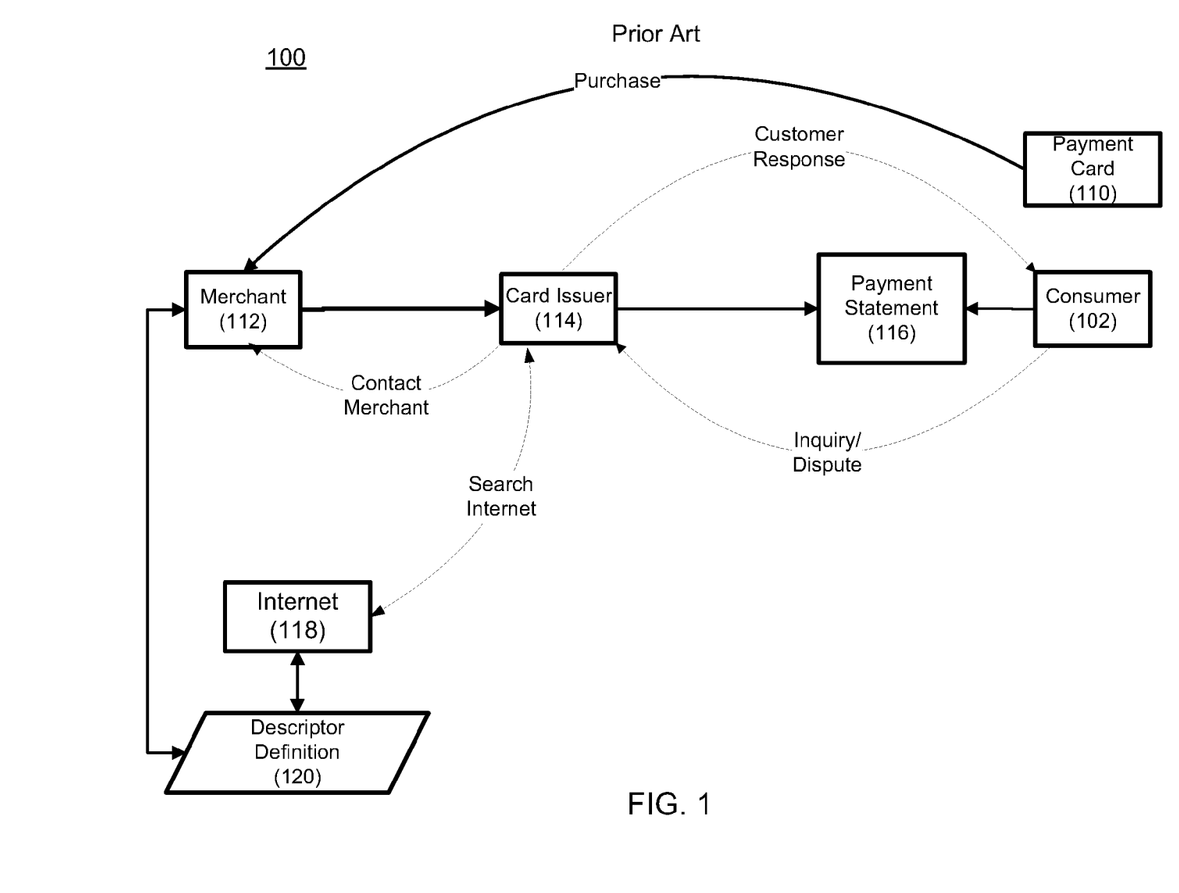
FIG. 1 illustrates a block diagram of a conventional system that can be used for providing descriptor information, according to some conventional implementations.

FIG. 1 illustrates an example of a conventional system 100 in which descriptor labels are provided by a merchant. System 100 includes consumer 102, payment card 110, merchant 112, card issuer 114, payment statement 116, and a descriptor definition 120. As further illustrated, descriptor definition 120 is created/edited by merchant 112, and provided to card issuer 114, e.g., via a network such as Internet 118.

In practice, card issuer 114 provides payment card 110 to consumer 102. When payment card 110 is used by consumer 102 to make a purchase from merchant 112, payment statement 116, which contains an itemization of the purchase (including a descriptor label), is in turn provided to consumer 102, using payment statement 116.

In the case that consumer 102 cannot understand the context of the purchase, and for example, wishes to dispute the associated charge, consumer 102 can launch an inquiry/dispute with card issuer 114. To provide additional context to consumer 102, card issuer 114 can either (1) contact merchant 112, or (2) do an internet search to determine if further information about the descriptor label on payment statement 116 can be found.

In the above scenario, the aggregate burden on card issuer 114 (e.g., to search for a descriptor definition for the descriptor label of payment statement 116), can be costly when the same lookup is performed for multiple consumers. Accordingly, aspects of the subject technology can be implemented that enable multiple parties to contribute to a descriptor repository or database, for example, that maintains a mapping between descriptor labels for various merchants and descriptor definitions, which provide supplemental context for associated financial transactions.

Figure 2:
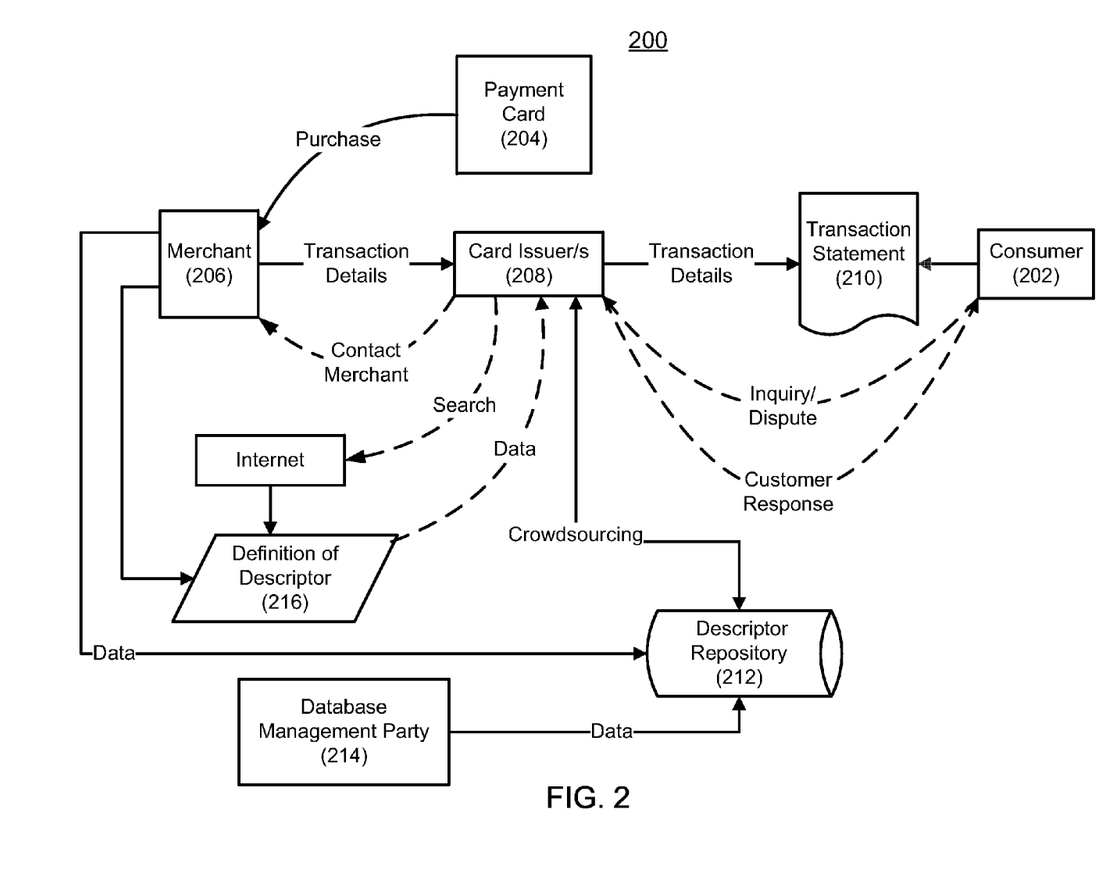
FIG. 2 illustrates a block diagram of an example system for implementing a crowdsourced descriptor repository, according to some implementations of the subject technology.

FIG. 2 illustrates an example of a system 200 that can be used to implement a descriptor repository 212, according to some implementations of the technology. As illustrated, system 200 includes consumer 202, payment card 204, merchant 206, one or more card issuer/s 208, transaction statement 210, descriptor repository 212, and a database management party 214.

Descriptor repository 212 can include descriptor labels identifying transactions with particular merchants, as well as descriptor definitions associated with the descriptor labels, for providing context of the associated transaction. In the example implementation illustrated by system 200, multiple parties have the ability to manage, update or contribute to descriptor repository 212. Specifically, card issuer 208, merchant 206, and database management party 214, each have the ability to add/update descriptor definitions and/or descriptor definition/descriptor label mappings maintained by descriptor repository 212.

Depending on implementation, the access rights necessary to add/edit or remove a particular descriptor label may be restricted to a specific party. By way of example, merchant 206 can be the only party authorized to add a descriptor label to descriptor repository 212, whereas card issuers 208 and/or database management party 214 may have the right to manage and update descriptor definitions and their respective descriptor label associations. By enabling multiple parties to contribute descriptor definitions to descriptor repository 212, as well as provide input as to how descriptor labels are associated with descriptor definitions, descriptor repository 212 can be crowdsourced, benefiting from updates/feedback provided my multiple parties and sources.

In practice, consumer 202 receives transaction statement 210, itemizing various financial transactions, such as a transaction with merchant 206. Transaction statement 210 contains transaction details providing various types of information about the transaction with merchant 206. For example, transaction details can include a descriptor label for merchant 206, as well as an initial descriptor definition that is paired with the descriptor label to provided consumer 202 with additional context for the respective transaction. In certain aspects, the transaction details provided by card issuer 208 e.g., onto transaction statement 210, are received directly from merchant 206. However, as illustrated, descriptor repository 212 can be used to supply additional information using one or more additional descriptor definitions for the descriptor label.

As indicated in system 200, descriptor repository 212 can include the aggregated input of card issuer 208, merchant 206 and/or a database management party 214. It is understood that database management party 214 may be any party with access rights to the descriptor repository, such as a third party that manages, hosts and/or maintains descriptor repository 212 for the benefit of merchant 206, card issuer/s 208 and/or consumer 202.

In the case where consumer 202 does not understand the details provided on transaction statement 210 or, for example, does not recall a purchase from merchant 206, consumer 202 will launch an inquiry with card issuer 208. Based on dialog with consumer 202, card issuer can have the ability to provide feedback to descriptor repository 212 that provides a relevance indication of the descriptor definition initially included with the descriptor label on transaction statement 210. By way of example, if the initial descriptor definition provided for the descriptor label was poorly understood or inaccurate, card issuer 208 may provide an indication or 'down vote' that will be used to reorganize descriptor depository, such that more relevant descriptor definitions are mapped to the subject descriptor label.

Alternatively, if the provided descriptor definition is accurate and helpful, for example, in facilitating a resolution of the customer's inquiry, card issuer 208 may provide an indication that the descriptor definition was highly relevant. In this manner, feedback based on the usefulness of a descriptor definition may be used to update/organize the descriptor repository.

In certain implementations, other parties can provide feedback that can be used to organize descriptor repository, for example, by associating the most relevant descriptor definitions with associated descriptor labels. Further to the illustration of system 200, both of merchant 206 and/or database management party 214 may provide updated descriptor definitions, or provide feedback to manually score the relevance/usefulness of descriptor definitions, thus affecting the associated descriptor label mappings.

Although system 200 of FIG. 2 illustrates an embodiment where various parties may directly edit, or provide feedback to, descriptor repository 212, in certain aspects, updating and management of descriptor repository is managed by a single party. By way of example, database management party 214, may create descriptor repository, as well as manage the updating of descriptor labels and descriptor definitions, and database associations. Feedback provided by any third party, e.g., consumer/s, merchant/s, and/or financial institutions may be arbitrated by database management party 214. As such, the services of, or access to, descriptor repository may be provided by database management party 214, e.g., to service one or more of merchant 206, card issuer/s 208, and/or consumer 202.

In certain aspects, mappings between descriptor definitions and descriptor labels can be managed using a machine learning implementation. For example, descriptor definition/label pairs associated with a lower percentage of customer inquiries may be automatically ranked to increase likelihood that a most relevant descriptor definition is associated with a descriptor label. In other implementations, natural language analysis may be used to determine the relative usefulness or relevance of descriptor definition/descriptor label associations.

Figure 3:
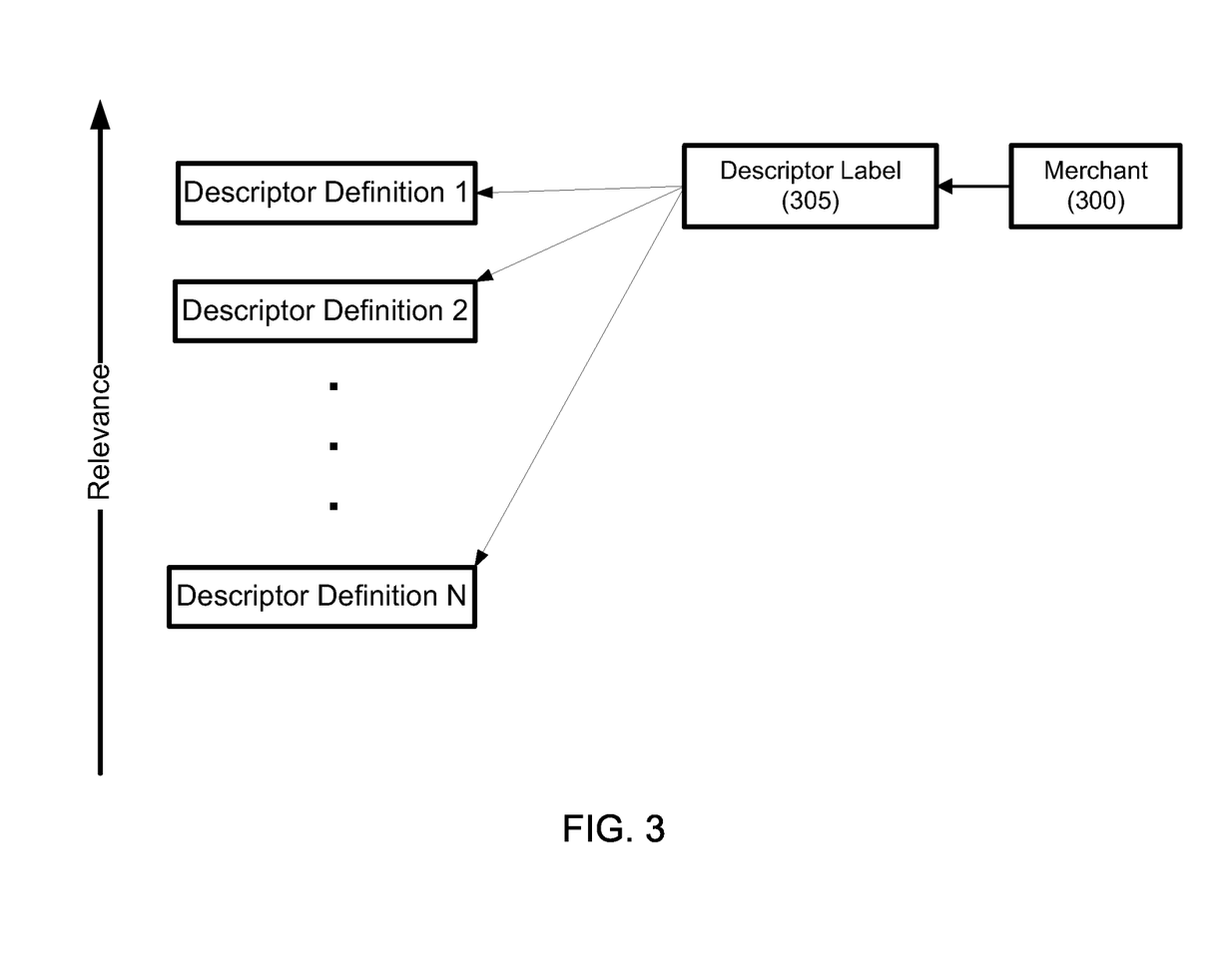
FIG. 3 conceptually illustrates an example relationship between a merchant, a descriptor label, and one or more descriptor definitions, according to some aspects of the subject technology.

FIG. 3 illustrates an example of a relationship between a merchant 300, a descriptor label 305, and descriptor definitions (e.g., Descriptor Definition 1 . . . Descriptor Definition N). As illustrated, merchant 300 is associated with (a single) descriptor label 305; however, it is understood that in other examples, merchant 300 may be associated with additional or different descriptor labels, which can be used to signify a financial transaction with merchant 300.

Descriptor label 305 may include various types of information included at the discretion of merchant 300. By way of non-limiting example, descriptor label 305 may include any, or all of, the following: a merchant name, address, telephone, location, merchant slogan or operating name. Accordingly, descriptor label 305 may include information that provides a consumer with contextual information, for which the consumer can identify a financial transaction conducted with merchant 300.

As discussed above, descriptor label 305 may be associated with one or more descriptor definition/s, wherein each of the descriptor definitions is provided by one or more parties. The descriptor definitions can be provided by the merchant; however, the invention is not limited to a particular source. For example, Descriptor Definition 1 may be created by merchant 300, and Descriptor Definition 2 may be created by a card issuer or financial institution (e.g., card issuer 208, above) that brokers payment services for merchant 300.

As illustrated, multiple descriptor definitions can be associated with a single descriptor label. In some embodiments, mappings between descriptor definitions and a descriptor label (e.g., descriptor label 305) are based on a determined relevance of the descriptor definition in providing or explaining the origin or context of financial transactions for merchant 300.

Descriptor definitions and their respective descriptor label mappings can be stored and maintained in a database separate from (and maintained independently of) merchant 300, as well as a card issuer, as shown in system 200 with respect to FIG. 2. Through the ability to receive both descriptor definitions, and relevance indications from multiple sources (crowdsourcing), aspects of the technology provide an adaptive crowdsourced means of managing a descriptor repository.

Figure 4:
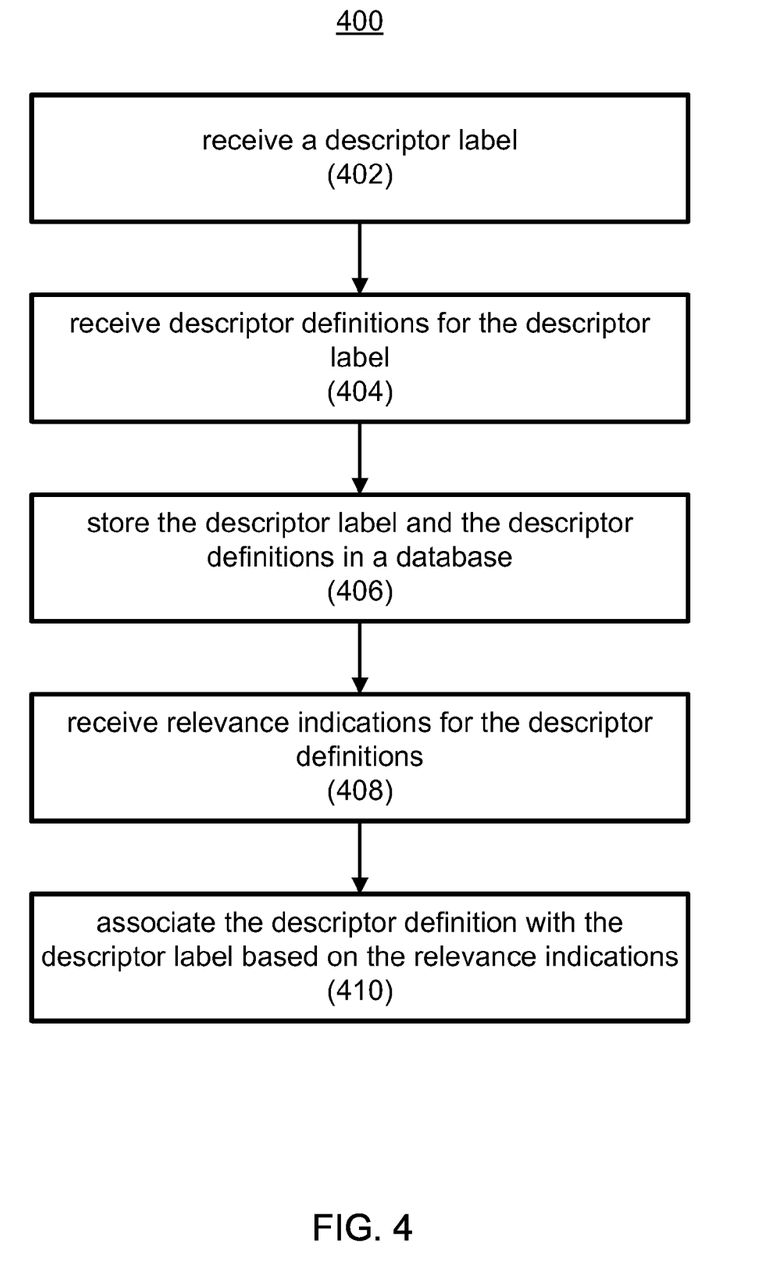
FIG. 4 illustrates an example method for providing a crowdsourced descriptor repository service, according to some implementations of the technology.

FIG. 4 illustrates a flow diagram of steps for an example method 400, used to implement aspects of the technology. Method 400 begins with step 402 in which a descriptor label is received, for example, by a descriptor database management system. As discussed above, the descriptor label is associated with a merchant and used to identify a financial transaction associated with the merchant on a customer's transaction statement.

In step 404, one or more descriptor definitions are received, wherein at least one of the descriptor definitions is associated with the descriptor label received in step 402. The descriptor definitions can include any type of information that can be used to provide context regarding the association between the descriptor label and the corresponding merchant.

In certain implementations, one or more descriptor labels may include a relevance indication, for example, that provides an indicated "relevance strength" for the respective descriptor label. Indications of relevance strength can be used when assigning and/or ranking descriptor definitions and determining their association with a particular descriptor labels. By way of example, a descriptor definition determined to be of a high "relevance strength" may be more highly ranked, and thus more likely to be returned with a respective descriptor label in response to a customer inquiry.

Subsequently, in step 406, the descriptor label and descriptor definitions are stored in a database e.g., descriptor repository 212 as discussed above. Although contributions to the descriptor repository may originate from multiple sources (crowdsourcing), there may be a single party designated to control central management and operation of the descriptor repository, such as Verifi, Inc.

In step 408, relevance indications are received for the descriptor definitions, for example, indicating a relative usefulness in providing context/explanation for the associated descriptor label. Relevance indications can include essentially any type of information or signal that can be used to determine a relative usefulness of one or more descriptor definitions. By way of example, a relevance indication may be provided as an "up vote" or "down vote." In other implementations, a relevance indication may be based on manual user input/feedback that is based on the ability of a particular descriptor definition to resolve a customer dispute/inquiry relating to the customer's inability to identify a transaction for a particular descriptor label.

In step 410, one or more descriptor definitions are associated with the descriptor label based on the relevance indications received in step 408. Depending on implementation, descriptor definitions may be associated with descriptor labels in different ways. For example, in some implementations, a most relevant descriptor definition (potentially from among many descriptor definitions), may be selected for association with a particular descriptor label. In another implementation, multiple descriptor definitions may be associated with a single descriptor label. In such instances, the number of descriptor definition associations may be limited to a predetermined number, such as the top three most relevant descriptor definitions.

Figure 5:
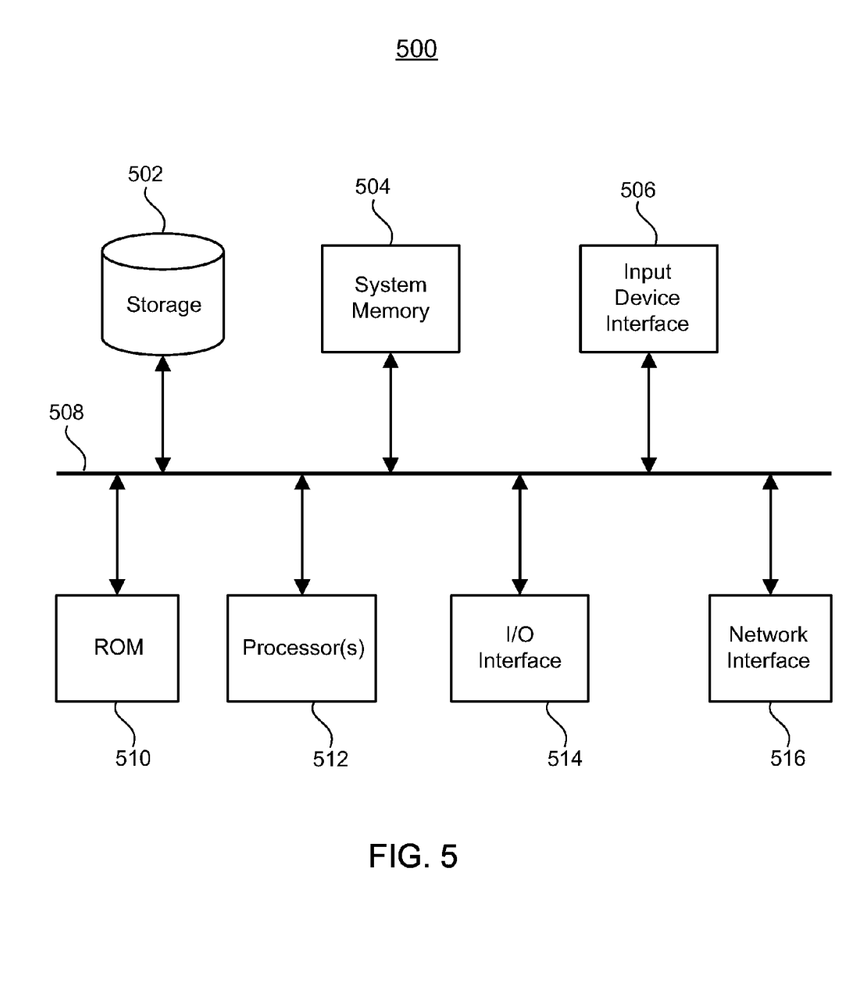
FIG. 5 illustrates an example of an electronic system with which some aspects of the subject technology can be implemented.

FIG. 5 conceptually illustrates an electronic system 500 with which some implementations of the subject technology can be implemented. Electronic system 500 can be a processor-based electronic device, such as a computer, or a server that is configured to host, update, and/or manage a descriptor repository, such as that described above with respect to system 500. Such an electronic system can include various types of computer readable media and interfaces for various other types of computer readable media. As illustrated, electronic system 500 includes bus 508, processing unit(s) 512, system memory 504, read-only memory (ROM) 510, storage device 502, input device interface 506, I/O interface 514 and network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and storage device 502.

From these various memory units, processing unit(s) 512 retrieves instructions to execute and data to process in order to execute the processes of the subject disclosure. The processing unit(s) can be a single processor or a multi-core processor in different implementations. ROM 510 stores static data and instructions that are needed by processing unit(s) 512 and other modules of the electronic system. Storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as storage device 502.

Other implementations use a removable storage device (such as a floppy disk, flash drive, and its corresponding disk drive) as storage device 502. Like storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, storage device 502, and/or ROM 510. For example, the various memory units include instructions for conducting experiments in accordance with some implementations. From these various memory units, processing unit(s) 512 retrieves instructions to execute and data to process in order to execute the processes of some implementations.

Bus 508 also connects to input and output device interfaces 506 and 514. Input device interface 506 enables the user to communicate information and select commands to the electronic system. Input devices used with input device interface i506 include, for example, alphanumeric keyboards and pointing devices (also called "cursor control devices"). Output device interface 414 enables, for example, the display of images generated by the electronic system 500. Output devices used with output device interface 414 can include, for example, printers and display devices, such as cathode ray tubes (CRT) or liquid crystal displays (LCD). Some implementations include devices such as a touchscreen that functions as both input and output devices.

Finally, bus 508 also couples electronic system 500 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Although certain examples provided herein can describe a user's information being stored in memory, the user can delete the user information from memory and/or choose to prevent the user information from being stored in memory. In example aspects, the user can adjust appropriate privacy settings to selectively limit the types of user information stored in memory and/or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

For clarity of explanation, the illustrative system embodiment is presented as including individual functional blocks including functional blocks labeled as a "processor." The functions these blocks represent may be provided through the use of either shared or dedicated hardware, including, but not limited to, hardware capable of executing software and hardware, such as processors 512, that is purpose-built to operate as an equivalent to software executing on a general purpose processor.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A descriptor repository comprising one or more computers, wherein the one or more computers are configured to perform operations for:
   receiving a descriptor label for a merchant, wherein the descriptor label comprises a merchant name, a merchant address, a merchant telephone, a merchant location, a merchant slogan, a merchant operating name, or a combination thereof, and wherein the descriptor label identifies financial transactions associated with the merchant;
   identifying at least one descriptor definition that maps to the descriptor label, wherein the at least one descriptor definition provides supplementary contextual information for the financial transactions associated with the descriptor label for a respective merchant, and comprises information directly received from a source other than the merchant, is not included in the descriptor label, and further describes the identified financial transactions associated with the descriptor label;
   storing the at least one descriptor definition in a database;
   receiving, from a network, a request for additional information associated with a transaction;
   identifying one or more of the descriptor definitions based on a comparison of at least a portion of information for the transaction with the descriptor labels associated with the one or more descriptor definitions, wherein one or more of the descriptor definitions includes at least one descriptor definition; and
   transmitting, to the network, a response including the one or more descriptor definitions.

2. The descriptor repository of claim 1, wherein the computers are further configured to perform operations for:
   receiving one or more additional descriptor definitions for the descriptor label; and
   updating the database to include the one or more additional descriptor definitions.

3. The descriptor repository of claim 1, wherein the computers are further configured to perform operations for:
   receiving a plurality of relevance indications for the at least one descriptor definition from a plurality of sources, wherein each of the relevance indications is based on a relative usefulness of a respective descriptor definition for supplementing the information included in financial transactions identified by the descriptor label,
   wherein said identifying is further based at least in part on the relevance indications.

4. The descriptor repository of claim 3, wherein at least one of the plurality of relevance indications is received from a financial institution.

5. The descriptor repository of claim 3, wherein at least one of the plurality of relevance indications is received from a customer of the merchant.

6. The descriptor repository of claim 3, wherein said identifying based at least in part on the relevance indications comprises automatically processing, using a machine learning model, one or more user interactions with the descriptor label, the machine learning model providing an output indicating the relative usefulness or relevance of the descriptor label for the descriptor definition.

7. The descriptor repository of claim 1, wherein two or more of the at least one descriptor definitions are received from different financial institutions.

8. The descriptor repository of claim 1, wherein two or more of the at least one descriptor definitions are received from different customers of the merchant.

9. A computer-implemented method, comprising:
   receiving a descriptor label for a merchant, wherein the descriptor label comprises a merchant name, a merchant address, a merchant telephone, a merchant location, a merchant slogan, a merchant operating name, or a combination thereof, and wherein the descriptor label identifies financial transactions associated with the merchant;
   identifying at least one descriptor definition that maps to the descriptor label, wherein the at least one descriptor definition provides supplementary contextual information for the financial transactions associated with the descriptor label for a respective merchant, and comprises information directly received from a source other than the merchant, is not included in the descriptor label, and further describes the identified financial transactions associated with the descriptor label;
   storing the at least one descriptor definition in a database;
   receiving, from a network, a request for additional information associated with a transaction;

identifying one or more of the descriptor definitions based on a comparison of at least a portion of information for the transaction with the descriptor labels associated with the one or more descriptor definitions, wherein one or more of the descriptor definitions includes at least one descriptor definition; and transmitting, to the network, a response including the one or more descriptor definitions.

10. The method of claim 9, further comprising:

receiving one or more additional descriptor definitions for the descriptor label; and updating the database to include the one or more additional descriptor definitions.

11. The method of claim 9, further comprising:

receiving a plurality of relevance indications for the at least one descriptor definition from a plurality of sources, wherein each of the relevance indications is based on a relative usefulness of a respective descriptor definition for supplementing the information included in financial transactions identified by the descriptor label, and wherein said identifying is further based at least in part on the relevance indications.

12. The method of claim 11, wherein at least one of the plurality of relevance indications is received from a financial institution.

13. The method of claim 11, wherein at least one of the plurality of relevance indications is received from a customer of the merchant.

14. The method of claim 11, wherein the relevance indications include inquiries for a descriptor label received from the network, and wherein said identifying based at least in part on the relevance indications comprises automatically processing, using a machine learning model, a number inquiries for the descriptor label received from the network, the machine learning model providing an output indicating the relative usefulness or relevance of the descriptor label.

15. The method of claim 9, wherein two or more of the at least one descriptor definitions are received from different financial institutions.

16. The method of claim 9, wherein two or more of the at least one descriptor definitions are received from different customers of the merchant.

17. A computer-readable storage medium comprising instructions stored therein, which when executed by one or more processors, cause the processors to perform operations comprising:

receiving a descriptor label for a merchant, wherein the descriptor label comprises a merchant name, a merchant address, a merchant telephone, a merchant location, a merchant slogan, a merchant operating name, or a combination thereof, and wherein the descriptor label identifies financial transactions associated with the merchant;

identifying at least one descriptor definition that maps to the descriptor label, wherein each of the descriptor definitions provides supplementary contextual information for the financial transactions associated with the descriptor label for a respective merchant, and comprises information directly received from a source other than the merchant, is not included in the descriptor label, and further describes the identified financial transactions associated with the descriptor label;

storing the at least one descriptor definition in a database;

identifying one or more of the descriptor definitions based on a comparison of at least a portion of information for the financial transactions with the descriptor labels associated with the one or more descriptor definitions, wherein one or more of the descriptor definitions includes at least one descriptor definition; and transmitting, to a network, a response including the one or more descriptor definitions.

18. The computer-readable storage medium of claim 17, wherein the operations further comprise:

receiving a plurality of relevance indications for the at least one descriptor definition from a plurality of sources, wherein each of the relevance indications is based on a relative usefulness of a respective descriptor definition for supplementing the information included in financial transactions identified by the descriptor label, and wherein said identifying is further based at least in part on the relevance indications.

19. The computer-readable storage medium of claim 18, wherein receiving the plurality of relevance indications comprises receiving a relevance indication including a natural language processing result indicating a natural language association between the descriptor label and a corresponding descriptor definition.

20. The computer-readable storage medium of claim 17, wherein two or more of the at least one descriptor definitions are received from different financial institutions.

* * * * *